United States Patent [19]

Fiorino et al.

[11] 3,804,992

[45] Apr. 16, 1974

[54] DIGITAL TIME SAMPLING PHASE COMPARATOR WITH NOISE REJECTION

[76] Inventors: Benjamin C. Fiorino, 1222 Princeton Dr., Longmont, Colo. 80501; Juan A. Rodriguez, 4236 Evans Dr., Boulder, Colo. 80302

[22] Filed: Mar. 13, 1972

[21] Appl. No.: 234,385

Related U.S. Application Data

[63] Continuation of Ser. No. 886,920, Dec. 22, 1969.

[52] U.S. Cl. .............................................. 178/69.5 R

[51] Int. Cl. .............................................. H04l 7/00

[58] Field of Search ................ 178/69.5 R; 325/325; 179/15 BS; 328/72, 134

[56] References Cited

UNITED STATES PATENTS

| | | | |
|---|---|---|---|
| 3,142,802 | 7/1964 | Maure | 178/69.5 R X |
| 3,200,198 | 8/1965 | McRae | 178/69.5 R |
| 3,462,551 | 8/1969 | Fong | 178/69.5 R |

*Primary Examiner*—Robert L. Richardson
*Attorney, Agent, or Firm*—Homer L. Knearl

[57] ABSTRACT

A digital time sampling phase comparator for use in a data receiving system to generate error correction pulses which are used to synchronize the generation of clock pulses with incoming data pulses. The phase comparator is time sampling because it generates error correction pulses whose time durations are equal to the time differences between transitions of input data pulses and reference transitions of generated clock pulses. In addition, the comparator has a noise rejection feature which removes from the correction pulses errors caused by random noise in the input data. Noise rejection is achieved by generating pulses for each positive and negative voltage transition of the input data pulses and ANDing these generated pulses with either a data or an inverted data pulse, depending upon whether the detected transition is positive or negative.

8 Claims, 8 Drawing Figures

DIGITAL TIME SAMPLING PHASE COMPARATOR WITH NOISE REJECTION

CROSS REFERENCE TO RELATED APPLICATION

This present patent matured from a continuation application of copending, commonly assigned and now abandoned application, Ser. No. 886,920, filed Dec. 22, 1969.

BACKGROUND OF THE INVENTION

1. Field of the Invention

This invention relates to phase comparators and more particularly to a phase comparator for use with a variable frequency oscillator in a pulse synchronizing system.

2. Description of the Prior Art

Variable frequency oscillators are commonly employed in data receivers since they provide an output clock signal which can be synchronized with incoming data in both phase and frequency. A variable frequency oscillator circuit consists basically of three elements:

a. a voltage controlled oscillator to provide a clock signal output;

b. a comparator to measure the phase difference between the clock signal and the input data signals; and c. a driver circuit for generating a control signal from the output of the comparator to vary the voltage applied to the voltage controlled oscillator and control the output frequency thereof.

Usually, these basic building elements include analog circuits which present the need to charge and discharge capacitors in timed relationships. With increasing data rates, errors induced by the time needed to sample and squelch capacitors have reduced the abilities of these analog variable frequency oscillators to follow the frequency variations in the input data signal.

Another limiting feature of this type of variable frequency oscillator is its inherent inability to reject noise. Typically, a noise transition of relatively large amplitude would be treated as a data transition, thereby introducing a correction to the frequency of the clock pulses regardless of the normally short duration of a noise pulse. One technique of noise rejection is described in U.S. Pat. No. 3,142,802, entitled "Synchronous Clock Pulse Generator." This technique does not sample the data input except at a time at which the information is expected to occur and thus rejects noise that occurs in other times. Such a method is not feasible at high frequency rates and, furthermore, does not eliminate the effect of noise during that time at which information is expected to occur.

SUMMARY OF THE INVENTION

It is thus an object of this invention to provide a comparator which eliminates the need for instantaneous charging and discharging of capacitors and thereby allows the clocking of higher frequency input data.

Another object of the invention is to provide a noise rejection feature which will reject noise on the basis of the duration of a noise pulse and thus allow for more accurate frequency control of the clock signal.

The comparator accepts the clock pulses and data pulses as inputs and generates as an output a pulse train of correction pulses whose widths are indicative of the phase difference between the clock and data pulses and whose polarity indicates whether the clock pulses should increase or decrease in frequency to synchronize with the data pulses.

It employs means for recognizing reference transitions of the clock pulses; either the positive or the negative transitions may be designated as the reference transitions. It also has means for generating pulses at each transition of the data pulses.

When incoming data transitions are at a higher frequency than the clock signal, a data transition sets a latch circuit which is reset by the next reference transition of the clock signal. Thus, the latch produces a series of correction pulses whose time durations are the same as those between the data transitions and the reference transitions. These correction pulses are applied to a driver circuit to increase the frequency of the voltage controlled oscillator, the amount of increase depending upon the widths of the correction pulses.

When the incoming data transitions are at a lower frequency than the clock signal a reference transition allows a capacitor to be charged from a constant current source. The next data transition then allows the capacitor to begin discharging and also sets a latch which generates a correction pulse. When the capacitor has been fully discharged the latch is reset. Thus the correction pulse is produced after the data transition occurs. Again, a train of these error correction pulses is applied to a driver circuit to decrease the frequency of the voltage controlled oscillator, the magnitude of the decrease depending upon the widths of the pulses.

The noise rejection feature of the invention operates on two principles: (1) noise generally lasts for a very short time, short even with respect to the period of high frequency data; and (2) noise can, therefore, be recognized by observing a change of polarity in data lasting for only a very short time. In this feature of the invention, pulse trains are generated for both the positive and negative transitions of the data pulses. A pulse representing a positive data transition sets a positive latch, indicating that data, if it is truly data, will remain positive, and a pulse representing a negative data transition sets a negative latch similarly indicating the presence of negative data. The setting of either the positive or negative latch prevents the setting of the other. Furthermore, two groups of such latches are present; one group is used at those times when clock pulses occur, the other when no clock pulses occur. The outputs of these positive and negative latch circuits are ANDed with the data pulses or the inverted data pulses, respectively, to produce the error correction pulses. Therefore, if the output of a negative latch is caused by a true data transition, then the output will be positive at the same time as the inverted data pulses and the AND gate's inputs will be satisfied producing an output which will be a pulse whose duration is equal to that of the output of the latch. If a noise pulse induced a transition in the data signal and thus set a latch, the inverted data signal will be positive for only a short period coinciding with the output of the latch. This short time will equal the duration of the noise pulse and thus the noise reduction feature has eliminated all noise errors from the correction pulses except for the short duration of the noise pulse. Similarly, the outputs of the positive latches are ANDed with the data signal to reduce noise induced errors in the correction pulses.

DESCRIPTION OF THE PREFERRED EMBODIMENT

Figures 1, 6:
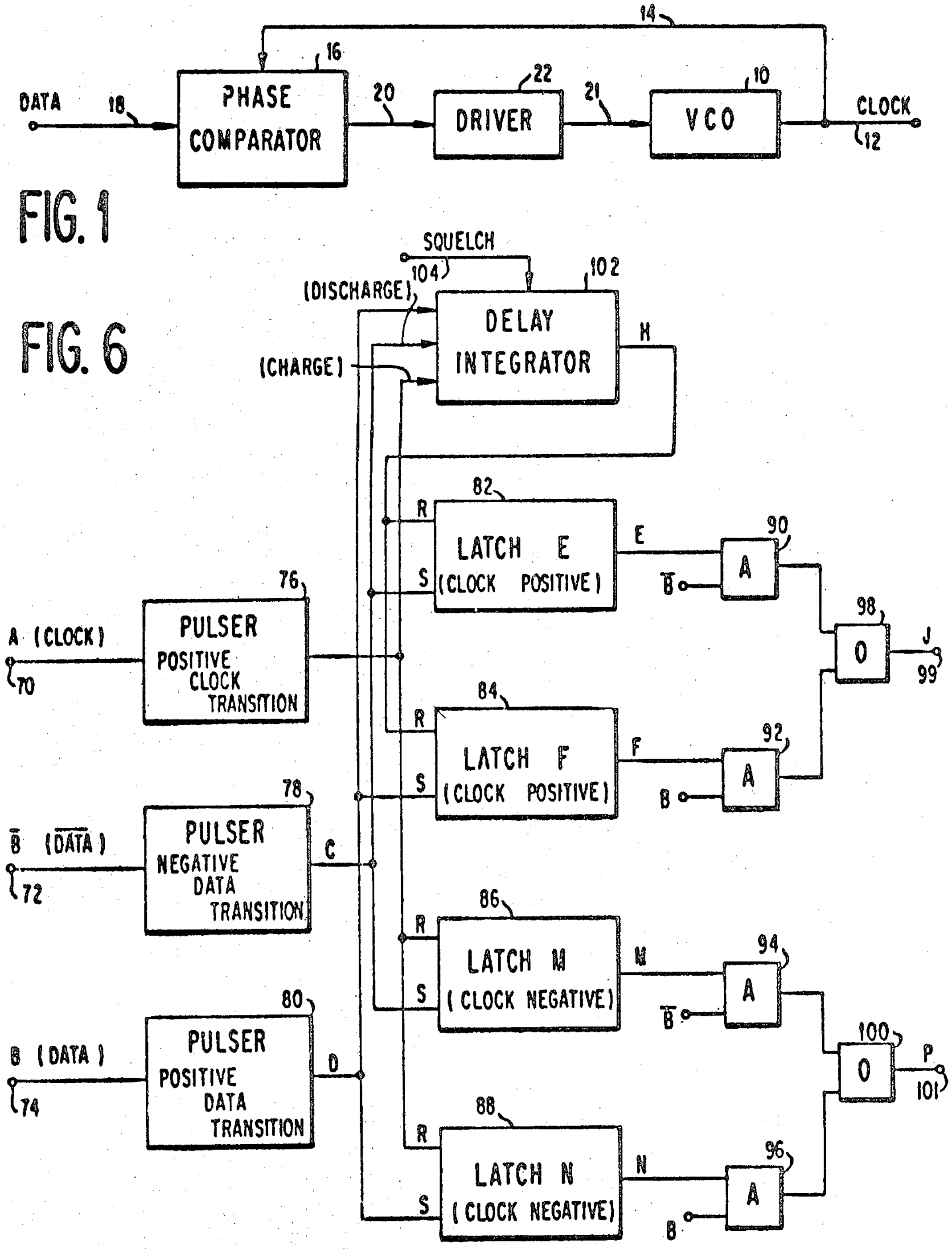
FIG. 1 is a block diagram of a type of variable frequency oscillator circuit in which the present invention may be employed.
FIG. 6 is a block diagram of the preferred embodiment of the invention.

FIG. 1 illustrates a type of synchronizing system in which the present invention may be employed. A clock signal consisting of a train of clock pulses, is generated by a voltage controlled oscillator 10 on an output line 12. A feedback line 14 allows a comparator 16 to compare the phase of the clock pulses with the input data pulses comprising an input data signal on input line 18. The comparator 16 generates an error correction signal consisting of a train of correction pulses whose widths are proportional to the phase difference between the clock and data pulses on line 20. This error correction signal is applied to driver 22 which produces a voltage to control the voltage controlled oscillator 10, thereby varying the frequency of the clock pulses to bring the clock pulses into synchronization with the incoming data pulses.

Figure 2:
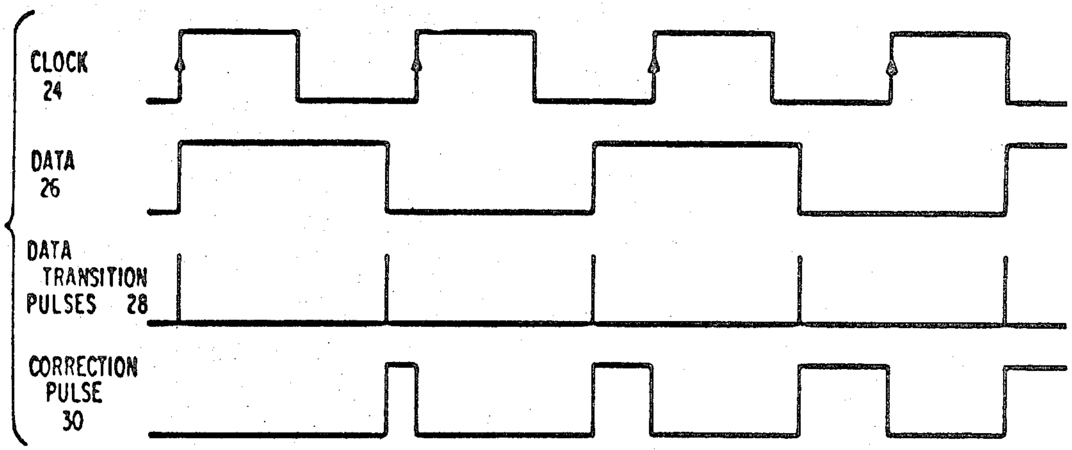
FIG. 2 is a wave diagram illustrating the operation of the invention when the data frequency is greater than the clock frequency.

FIG. 2 illustrates basic waveforms which describe the underlying operation of the present invention. Line 24 shows the clock pulses, for example, the output of voltage controlled oscillator 10 as shown in FIG. 1. The positive transitions of the clock pulses, as marked with an arrow, are designated as the reference transition although the negative transitions could also be used. An incoming data signal is shown on line 26 and it can be seen that the data transitions are at a higher frequency than the clock signal. Data transition pulses as shown on line 28 are generated at each transition in the incoming data signal, and are used to set a latch circuit; the reference transitions in the clock signal are used to reset this latch circuit thereby generating correction pulses as shown on line 30 whose durations are equal to the time intervals between the data transitions and the reference transitions. These correction pulses are used by a driver circuit 22 as shown in FIG. 1 to vary the frequency of the voltage controlled oscillator 10 and hence to synchronize the clock pulses with the incoming data pulses. The amount of correction required depends upon the widths of the correction pulses.

Figure 3:
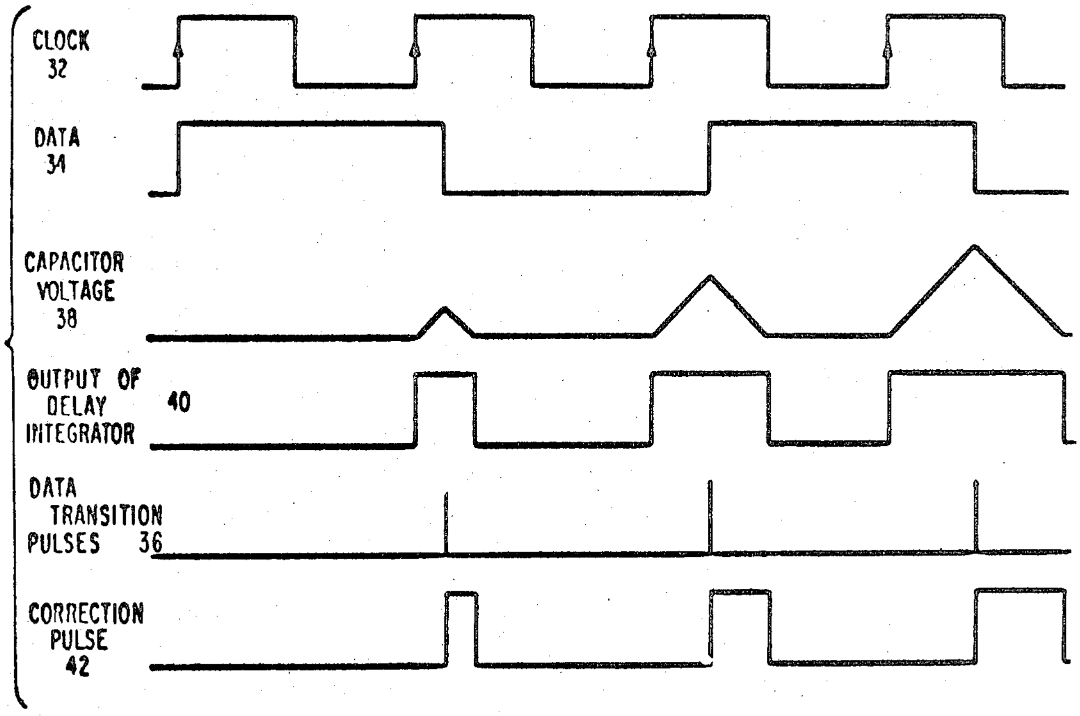
FIG. 3 is a wave diagram illustrating the operation of the invention when the data frequency is less than the clock frequency.

FIG. 3 illustrates similar waveforms when the incoming data transition frequency is lower than that of the clock frequency. The clock pulses are illustrated on line 32, and the data pulses on line 34. Data transition pulses are again generated as illustrated on line 36. Since the data transition frequency is lower than the clock frequency, a reference transition of the clock pulse occurs before a data transition and upon this reference transition, a capacitor begins charging with a constant current. The voltage waveform across this capacitor is illustrated in line 38. A positive voltage across the capacitor, either when charging or discharging, causes a delay integrator to produce a pulse output as illustrated on line 40. A data transition pulse occurs next and sets a latch which generates a correction pulse as illustrated on line 42. This latch is reset when the capacitor is fully discharged as indicated by a lack of an output from the delay integrator as shown on line 40. As in the case when the data transition frequency was higher than the clock frequency, correction pulses have been generated whose time durations are the same as that between the reference transitions and the data transition pulses, but here it should be noted that the correction pulses do not occur until after the transitions rather than between them.

Figure 4:
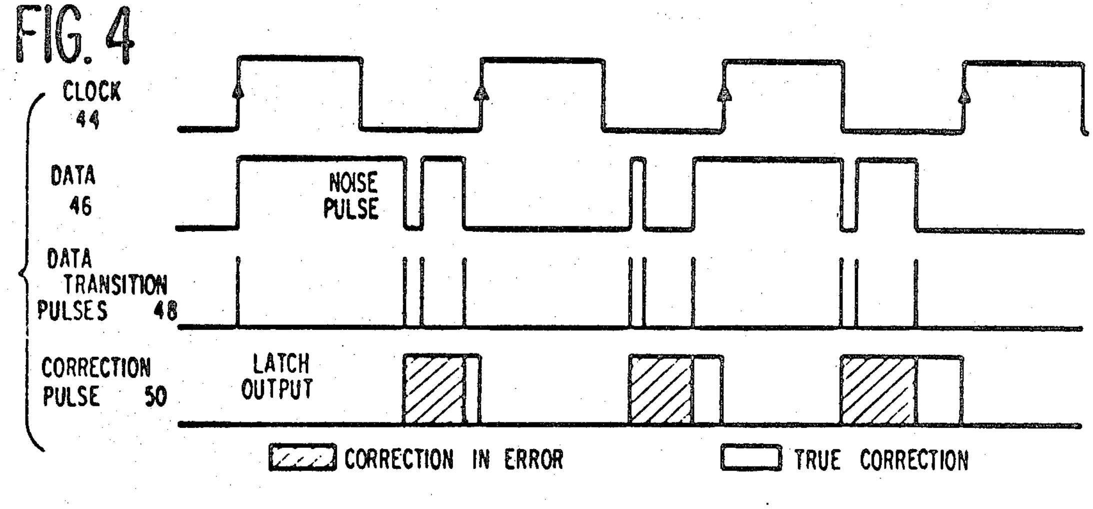
FIG. 4 is a wave diagram illustrating noise induced errors.

FIG. 4 illustrates the disadvantageous effect that noise may have on the above described system. A noise pulse in the data signal, as illustrated on the line 46, would cause erroneous data transition pulses as shown on line 48. A latch circuit would not be able to discriminate noise transitions from actual data transitions and would generate a much larger correction pulse than actually required as shown on line 50.

Figure 5:
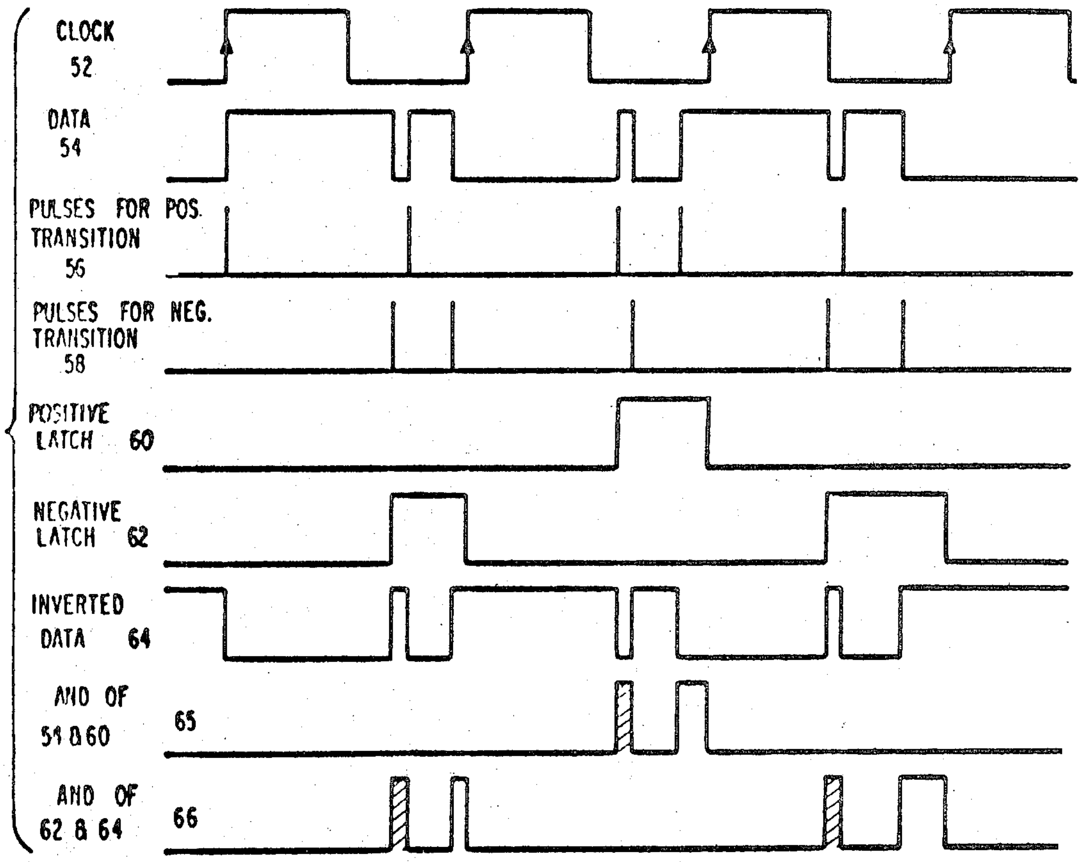
FIG. 5 is a wave diagram illustrating the noise rejection feature of the subject invention.

FIG. 5 illustrates waveforms which are used in the explanation of the noise rejection technique of the invention. Line 52 illustrates the clock pulses as before and line 54 illustrates the data pulses with injected random noise pulses. In order to detect noise, the polarity of the data signal has to be detected. Therefore, independent pulses are generated from both the positive data transition as shown on line 56 and from the negative data transition as shown on line 58. The positive transition pulse sets a positive latch, indicating that data, if it is truly data, will remain positive. A negative transition pulse sets a negative latch, similarly indicating the presence of negative data. The outputs from these latches are illustrated on lines 60 and 62, respectively. The latches are interconnected so that if one is set the other is prevented from setting. Two groups of these latches are provided; one group is employed whenever a clock pulse is present, that is when the clock signal is positive, the other when no clock pulse is present, that is when the clock signal is negative, however, only the outputs of those latches associated with the negative clock signal are illustrated in FIG. 5, since noise is shown only during the negative portion of the clock signal. The first noise pulse illustrated produces two data transition pulses, the first negative, the second positive, as illustrated on lines 58 and 56. The negative latch (set by a negative data transition), whose output waveform is illustrated on line 62, sets first and thus prevents the positive latch whose output waveform is shown on line 60, from setting. By ANDing the output of the negative latch as shown on line 62 with the inverted data signal as shown on line 64, a correction to the error pulse is produced as illustrated on line 66, where the first pulse still represents an error in the correction pulse caused by noise; however, this error has been reduced to a time duration equal to the time of the noise pulse. Since noise characteristically lasts for a very short time, this error will be very slight and is far less than the error produced otherwise, for example, without such a noise rejection feature a 10 nanosecond noise pulse placed at 240 nanoseconds from a reference transition would induce an error 24 times that of the error with such a noise rejection feature. In a similar fashion, the output of the positive latch as shown on line 60 is ANDed with the data signal shown on line 54 to produce an error reduced waveform as illustrated in line 65.

FIG. 6 illustrates a block diagram of a circuit arrangement to implement the invention as described above. Input terminals 70, 72 and 74 are provided to receive respectively, a clock signal, an inverted data signal, and a data signal. The clock signal is generated by, for example, a voltage controlled oscillator 10 as shown in FIG. 1. A pulser 76 generates a pulse at either negative or positive transitions of the clock pulses whichever have been designated as the reference transitions; as described hereinafter, positive transitions have been selected as the reference transitions. Similarly, pulsers 78 and 80 generate pulses at negative and positive transitions of the data pulses, respectively.

Latch circuits 82, 84, 86, and 88 are conventional circuits each of which generates a pulse whose duration is equal to the time between the incidence of a pulse at its set (S) input and the incidence of a pulse at its reset (R) input. Latches 82 and 84 are connected so that they operate only when a clock pulse occurs, that is when the clock signal is positive, and latches 86 and 88 are connected so that they operate only when no clock pulse is present, that is when the clock signal is negative. In addition, they are interconnected in such a fashion that an output from one latch will prevent any of the others from operating.

The AND circuits 90, 92, 94 and 96 are employed in the noise rejection feature of the invention for ANDing either the data signal or inverted data signal with the outputs from the latch circuits in order to reduce noise induced errors as described above. The OR circuits 98 and 100 are employed to combine the outputs from AND gates 90, 92 and 94, 96, respectively. The output error correction signals at terminals 99 and 101, one for a positive correction and the other for a negative one, are transmitted to a driver 22, as illustrated in FIG. 1. The driver employs these pulses to develop a voltage to drive the voltage controlled oscillator 10 so as to increase or decrease its frequency as required.

A delay integrator 102 comprises, for example, a capacitor (not shown) which begins charging from a constant current source (not shown) at each reference transition of the clock pulses as determined by the output from the pulser 76. The capacitor begins discharging whenever a transition in the data signal occurs as determined by the outputs from the pulsers 78 and 80. The output from the delay integrator 102 is a pulse whose duration equals the time used in charging and discharging this capacitor and is used to reset latches 82 and 84. In addition, a terminal 104 is provided for squelching the discharge of this capacitor at certain times as described below.

Figure 7:
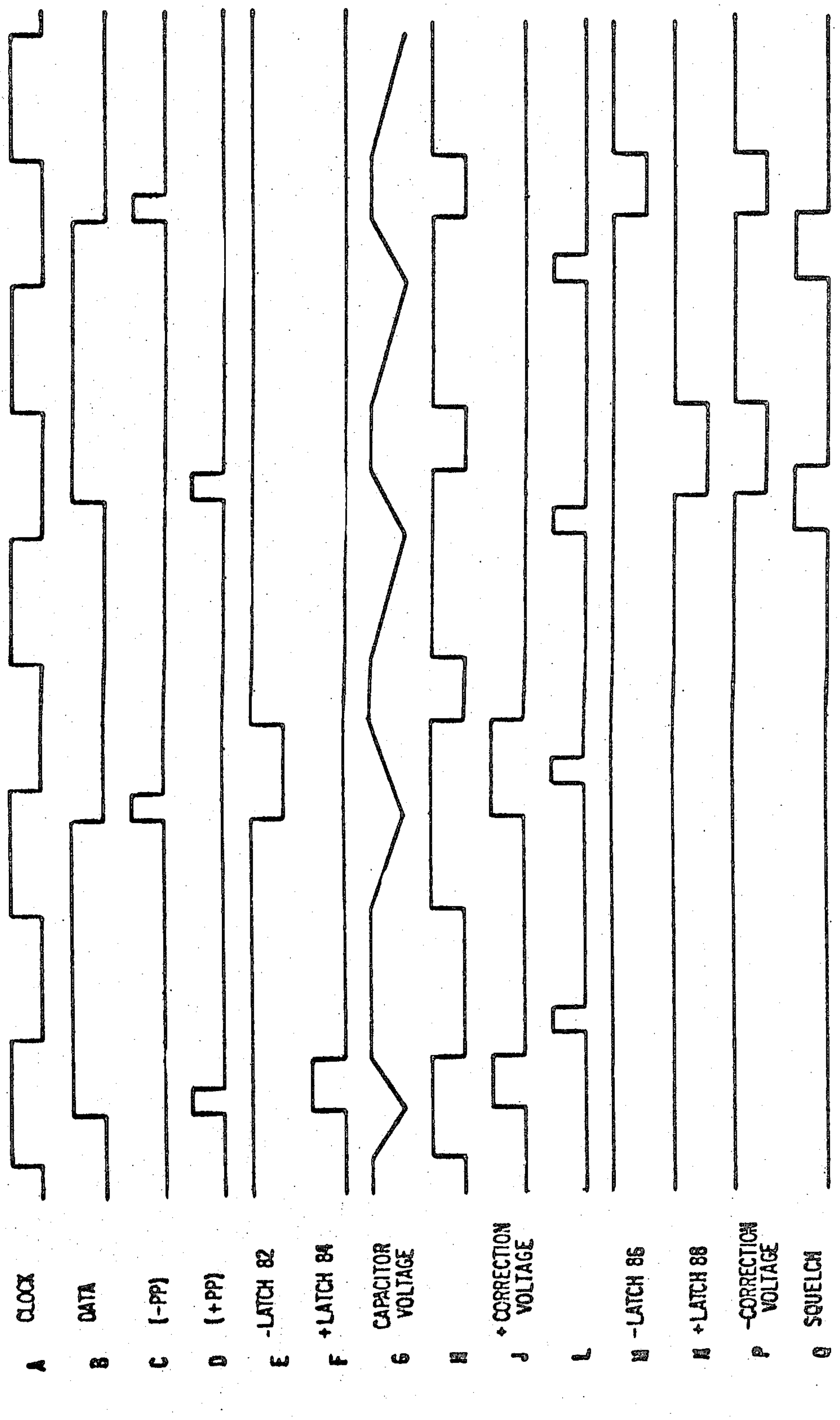
FIG. 7 is a wave diagram used to explain the operation of the invention.

FIG. 7 illustrates waveforms generated by the circuit shown in FIG. 6 and is useful to explain the operation of the invention. The incoming clock signal A on terminal 70 causes the pulser 76 to emit a pulse which is transmitted to the delay integrator 102. This pulse will cause a constant current source to begin charging a capacitor as illustrated by waveform G.

A positive transition of the data signal as shown by waveform B next occurs at terminal 74 which causes the pulser 80 to generate a pulse as shown by waveform D. This pulse will set latch 84 (waveform F - latches 82, 84, 86 and 88 are labeled "+" or "−" in FIGS. 7 and 8 to indicate they are set by positive or negative data transitions respectively) and furthermore cause the capacitor in the delay integrator 102 to begin discharging at the same constant rate at which it was previously charging. The delay integrator 102 is therefore performing a timing function and has a pulse output, as illustrated by waveform H, whose duration is equal to the time the capacitor is charging and discharging. When the output of the capacitor has completely discharged, latch 84 is reset and no longer produces an output as shown by waveform F. Since the data signal B is positive, the inputs to AND gate 92 are satisfied and a correction signal will appear at terminal 99 as illustrated by waveform J.

A reference transition of the clock signal next occurs and again causes the delay integrator to have an output as illustrated by waveform H. The next data transition is negative and thus causes the pulser 78 to generate a pulse as illustrated by waveform C. This pulse causes the latch 82 (waveform E) to be set, and, in addition, causes the capacitor in the delay integrator 102 to start discharging. When the capacitor is completely discharged, the output from the delay integrator 102 as illustrated by waveform H causes the latch 82 to be reset. Since the data signal is negative, the input to AND circuit 90 are satisfied. The output from latch 82, thus appears at output terminal 99 as the correction signal as illustrated by waveform J.

As can be seen, during the next positive clock cycle no data transition occurs. Therefore, a slow squelch is applied to the capacitor in the delay integrator 102 as illustrated by the squelch waveform on line Q. The squelch occurs whenever there is an output from the delay integrator, the clock signal is negative, and neither latch 82 nor 84 has an output and, thus in equation form: SQUELCH $= H \cdot \bar{E} \cdot \bar{F} \cdot \bar{A} \cdot$ The squelch is triggered by the waveform L, a pulse train whose constituent pulses are generated at negative transitions of the clock pulses.

The next data transition is positive but occurs in the negative portion of the clock signal, therefore, as described above latches 82 and 84 are inoperative whereas 86 and 88 are operative. The positive data transition thus causes the pulser 80 to set latch 88 (waveform N). A reference transition of the clock pulse next occurs and causes the latch 88 to be reset. The inputs to AND gate 96 are satisfied since the data signal is positive and, thus, the output of latch 88 will occur at the output terminal 101 as a correction signal as illustrated by the waveform P.

The next data transition is negative causing pulser 78 to emit a pulse as shown by waveform C which sets latch 86 (waveform M). The next reference transition of the clock pulse will reset latch 86. The output of latch 86 appears at output terminal 101 as a correction signal as illustrated by waveform P since the data signal is negative and, thus, the conditions of AND gate 94 are satisfied.

Figure 8:
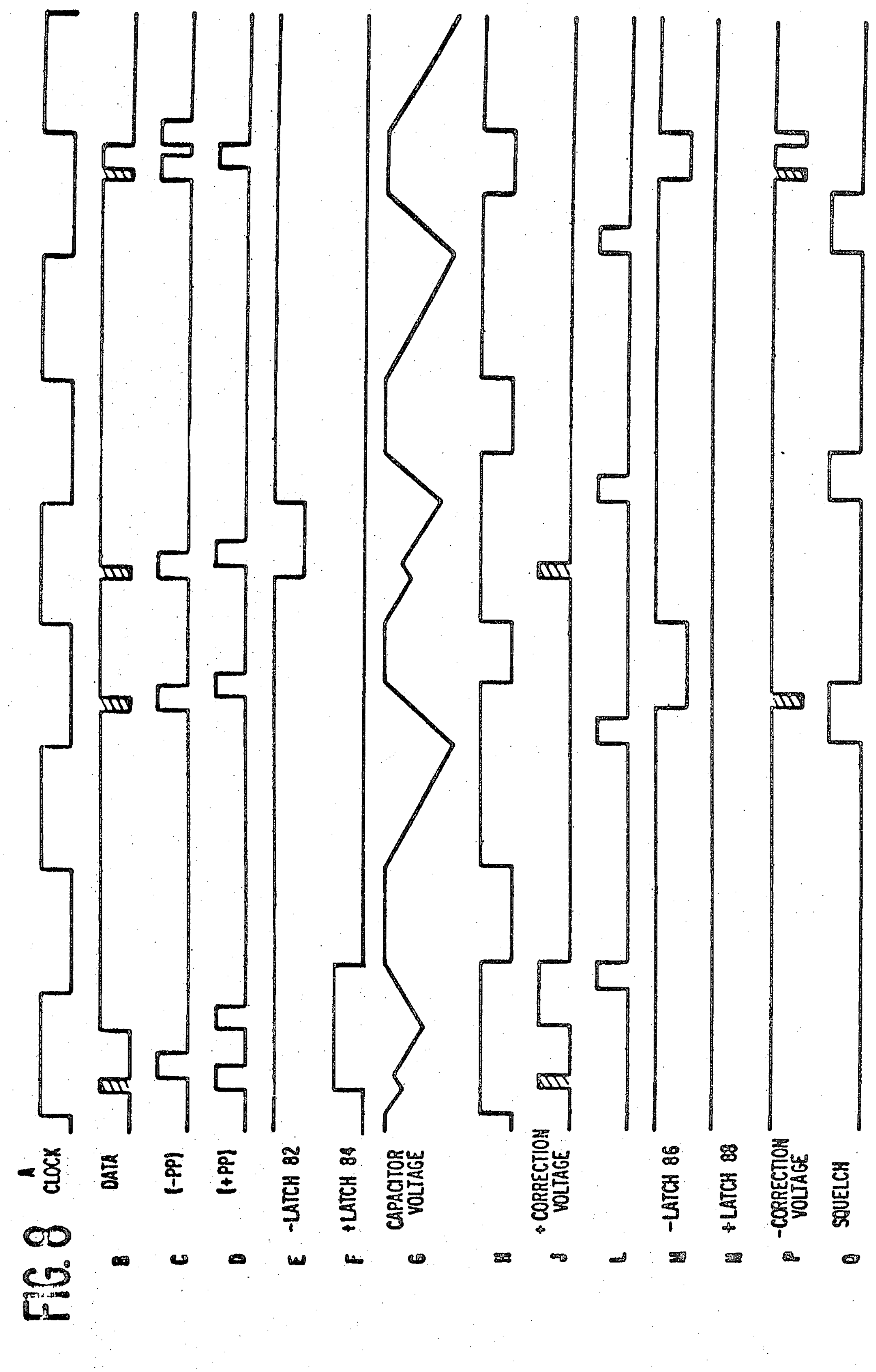
FIG. 8 is a wave diagram used to explain the noise rejection feature of the subject invention.

FIG. 8 illustrates various cases for noise injected into the data signal and is useful in explaining the noise rejection feature of the invention. Basically, this feature comprises the use of the AND gates 90, 92, 94 and 96 in order to AND the output of the latches 82, 84, 86 and 88 with either the data signal or inverted data signal in order to reduce any noise induced errors in the correction signal. As shown by waveform F, the first noise pulse in waveform B, as indicated by shading, induces an error in the duration of the correction pulse produced by latch 84 (waveform F) since it produces a data transition pulse which sets latch 84. Much of the induced error can be eliminated by ANDing the output of latch 84 with the data signal as is done by the AND gate 92. The output from the AND gate will then appear as shown in waveform J, the only remaining error being a small pulse whose duration is equal to that of the noise pulse. Since noise is characteristically of a very short duration, this induced error will be very small.

In a similar fashion noise is rejected during negative clock signals as indicated by the second noise pulse in waveform B. The noise pulse has erroneously caused the latch 86 (waveform M) to be set; however, the output from the latch 86 is ANDed with an inverted data signal which is positive only during that time in which noise is present and therefore only a very small error is produced in the correction voltage as illustrated by waveform P.

A small problem with this technique arises with the third noise pulse in waveform B. Here the noise pulse sets latch 82 (waveform E) and thus prevents latch 84 from being set. As explained above, an error in the correction signal will occur only for the width of the noise pulse as illustrated by waveform J but latch 82 will now remain set because the capacitor voltage has not yet completely discharged and, in fact, if nothing is done will continue to charge. If a true data transition were now to occur, latch 82 would prevent the other latches from setting since it has not yet reset. To prevent this from happening, latches 82 and 84 are reset whenever the clock signal is negative and there is no positive correction signal (waveform J) present. This is the purpose for the waveform L, a pulse train whose constituent pulses are generated at the negative transitions of the clock signal. Upon resetting the latches, the conditions for squelch are met as explained above.

While the invention has been particularly shown and described with reference to a preferred embodiment thereof, it will be understood by those skilled in the art that various changes in form and details may be made therein without departing from the spirit and scope of the invention.

What is claimed is:

1. In a data receiving system having input means for receiving data pulses and variable frequency oscillator circuit means for generating clock pulses, a digital phase comparator comprising:

a. means for detecting either the positive or negative transitions of said clock pulses as reference transitions;
b. means for detecting both positive and negative transitions of said data pulses;
c. means coupled to both of said detecting means for generating error correction pulses having a duration equal to the time difference between said transitions of said data pulses and said reference transitions of said clock pulses;
d. means responsive to said error correction pulses for controlling said variable frequency oscillator circuit means to synchronize said clock pulses with said data pulses;
e. circuit means for inverting said data pulses; and
f. noise rejection circuit means coupled between said means for generating error correction pulses and said means for controlling said variable frequency oscillator circuit means and comprising:
   1. first comparator means coupled to said means for generating error correction pulses and to said input means for receiving data pulses for generating pulses during those time intervals when the error correction pulses asso-ciated with said positive transitions of said data pulses are coincidental with said data pulses; and
   2. second comparator means coupled to said means for generating error correction pulses and to said means for inverting said data pulses for generating pulses during those time intervals when the error correction pulses associated with said negative transition of said data pulses are coincidental with said inverted data pulses, whereby said pulses generated by said first and second comparator means represent modified error correction pulses with reduced noise errors and are applied to the inputs of said means for controlling said variable frequency oscillator circuit means.

2. The phase comparator of claim 1 wherein said means for generating error correction pulses comprises:

a. bistable circuit means having first and second input terminals and operating to initiate an output pulse when a pulse is received at said first input terminal and to terminate said output pulse when a pulse is received at said second input terminal;
b. timing means coupled to both of said detecting means for generating a timing pulse whose width is equal to the time interval between said reference transitions and said transitions of said data pulses;
c. first interconnection means between said means for detecting said transitions of said data pulses and said first terminal of said bistable circuit;
d. second interconnection means between said means for detecting reference transitions and said second terminal of said bistable circuit for terminating said output pulse from said bistable circuit;
e. third interconnection means between said timing means and said second terminal of said bistable circuit for terminating said output pulse from said bistable circuit with said timing pulses, whereby, if a transition of said data pulses precedes a reference transition, said first and second interconnection means allow said data transition to initiate and said reference transition to terminate said output pulse from said bistable circuit means, and if a reference transition precedes a data transition, said first and third interconnection means allow said data transition to initiate, and said timing means to terminate, said output pulse from said bistable circuit means, a series of said output pulses from said bistable circuit means comprising said error correction pulses.

3. The phase comparator of claim 2 wherein said means for detecting either the positive or negative transitions of said clock pulses comprises pulse generating means for generating pulses which are used as inputs to said bistable circuit.

4. The phase comparator of claim 1 wherein said means for detecting positive and negative transitions of said input data signal comprises pulse generating means for generating pulses which are used as inputs to said bistable circuit.

5. In a data receiving system having input means for receiving data pulses and variable frequency oscillator circuit means for generating clock pulses, a digital phase comparator comprising:

means for detecting either the positive or negative transitions of said clock pulses as reference transitions;

means for detecting both positive and negative transitions of said data pulses;

means coupled to both of said detecting means for generating error correction pulses having a duration equal to the time difference between said transitions of said data pulses and said reference transitions of said clock pulses;

means responsive to said error correction pulses for controlling said variable frequency oscillator circuit means to synchronize said clock pulses with said data pulses;

noise rejection means, coupled to said means for generating error correction pulses, for substantially eliminating the effects of noise on said means for controlling said variable frequency oscillator circuit;

said noise rejection means comprises an AND gate having one input connected to receive said error correction pulses and another input connected to receive said data pulses, whereby an error correction pulse produced by a noise pulse in said data has a width equal to the width of the noise pulse, said width being small relative to the widths of the error correction pulses caused by said time difference between said transitions of said data pulses and said reference transitions of said clock pulses.

6. In a data receiving system having input means for receiving data pulses, which may contain noise pulses, and variable frequency oscillator circuit means for generating clock pulses, a digital phase comparator comprising:

comparing means for comparing said data pulses and said clock pulses and for producing error correction pulses indicative of the phase difference between said data pulses and said clock pulses and the phase difference between said noise pulses, if present, and said clock pulses;

noise rejection means for comparing said error correction pulses with said data pulses;

said noise rejection means in response to the noise rejection comparison producing an output of modified error correction pulses indicative of phase difference between said data pulses and said clock pulses and substantially free of the phase difference between said noise pulses and said clock pulses;

means responsive to said modified error correction pulses for controlling said variable frequency oscillator circuit means to synchronize said clock pulses with said data pulses.

7. A method of synchronizing in both phase and frequency clock pulses with a train of data pulses comprising:

a. detecting either positive or negative transitions of the clock pulses as reference transitions;

b. detecting both positive and negative transitions of the data pulses;

c. generating error correction pulses having a pulse width equal to the time difference between the transitions of said data pulses and the reference transitions of the clock pulses;

d. eliminating the effect of noise pulses in the train of data pulses by producing an output pulse only when the error correction pulses and the data pulses occur simultaneously, whereby noise pulses in the train of said data pulses produce error correction pulses which have substantially zero pulse width; and e. controlling the frequency of the clock pulses with the output pulse to synchronize the clock pulses with the data pulses.

8. The method of claim 7 wherein the elimination of the effect of noise pulses comprises:

a. comparing said error correction pulses with said data pulses; and b. producing a modified error correction pulse only when there is coincidence between said error correction pulses and said data pulses.

* * * * *

PO-1050 (5/69)

UNITED STATES PATENT OFFICE
CERTIFICATE OF CORRECTION

Patent No. 3,804,992 Dated April 16, 1974

Inventor(s) Benjamin C. Fiorino et al

It is certified that error appears in the above-identified patent and that said Letters Patent are hereby corrected as shown below:

In the heading, add --Assignee: International Business Machines Corporation, Armonk, New York--.

This assignment was recorded on December 22, 1969, at Reel 2562, Frame 375.

Column 8, line 9, "asso-ciated" should be --associated--;

line 39, after "circuit" insert --means for initiating said output pulse from said bistable circuit--.

Signed and sealed this 1st day of October 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,804,992 Dated April 16, 1974

Inventor(s) Benjamin C. Fiorino et al.

It is certified that error appears in the above-identified patent and that said Letters Patent are hereby corrected as shown below:

Column 5, lines 50 and 51, delete "begins discharging" and insert -- changes its charging/discharging state --.

Signed and sealed this 18th day of February 1975.

(SEAL)
Attest:

RUTH C. MASON
Attesting Officer

C. MARSHALL DANN
Commissioner of Patents
and Trademarks

FORM PO-1050 (10-69)

USCOMM-DC 60376-P69
U.S. GOVERNMENT PRINTING OFFICE 869-930